United States Patent
Shi et al.

(10) Patent No.: US 10,091,747 B2
(45) Date of Patent: Oct. 2, 2018

(54) SIGNAL AMPLIFYING DEVICE, METHOD FOR CONTROLING SIGNAL AMPLIFYING DEVICE AND METHOD FOR IDENTIFYING SIGNAL AMPLIFYING DEVICE

(71) Applicant: Spreadtrum Communications (Shanghai) Co., Ltd., Shanghai (CN)

(72) Inventors: Yanshan Shi, Shanghai (CN); Yi Kang, Shanghai (CN)

(73) Assignee: SPREADTRUM COMMUNICATIONS (SHANGHAI) CO., LTD, Shanghai (CN)

( * ) Notice: Subject to any disclaimer, the term of this patent is extended or adjusted under 35 U.S.C. 154(b) by 175 days.

(21) Appl. No.: 15/054,291

(22) Filed: Feb. 26, 2016

(65) Prior Publication Data

US 2016/0255599 A1    Sep. 1, 2016

(30) Foreign Application Priority Data

Feb. 27, 2015 (CN) .......................... 2015 1 0090143

(51) Int. Cl.
*H04W 56/00* (2009.01)
*H04B 7/155* (2006.01)

(52) U.S. Cl.
CPC ...... *H04W 56/001* (2013.01); *H04B 7/15542* (2013.01); *H04W 56/00* (2013.01); *Y02D 70/00* (2018.01); *Y02D 70/1224* (2018.01); *Y02D 70/1242* (2018.01); *Y02D 70/1262* (2018.01); *Y02D 70/1264* (2018.01); *Y02D 70/142* (2018.01); *Y02D 70/23* (2018.01); *Y02D 70/446* (2018.01)

(58) Field of Classification Search
None
See application file for complete search history.

(56) References Cited

U.S. PATENT DOCUMENTS

| | | | | |
|---|---|---|---|---|
| 2008/0080414 A1* | 4/2008 | Thubert | ............. | H04W 76/022 370/328 |
| 2013/0107793 A1* | 5/2013 | Gan | ...................... | H04B 7/155 370/315 |
| 2013/0142106 A1* | 6/2013 | Zhang | ............... | H04W 56/0015 370/315 |

(Continued)

*Primary Examiner* — Kodzovi Acolatse
(74) *Attorney, Agent, or Firm* — Vierra Magen Marcus LLP (57) ABSTRACT

A signal amplifying device and methods for control a signal amplifying device and for identifying a signal amplifying device are provided. The device includes: a baseband module, a user identification module interface, return side RF modules and antennas, access side RF modules and antennas. The return side antenna receives a downlink signal, which is transmitted to a corresponding access side RF module and the baseband module. An uplink signal is received by the access side antenna, which is transmitted to a corresponding return side RF module and the baseband module. The baseband module is adapted to process the uplink/downlink signal, control synchronization of the return side RF module and the access side RF module and control turning on and off of the same, read a user information. Accordingly, a cellular network can control a micropower repeater effectively, and further more functionality can be added and performance can be improved.

16 Claims, 4 Drawing Sheets

(56) References Cited

U.S. PATENT DOCUMENTS

| | | | |
|---|---|---|---|
| 2013/0237260 A1* | 9/2013 | Lin ........................ | H04B 1/525 455/501 |
| 2013/0315134 A1* | 11/2013 | Halfmann ........... | H04W 84/047 370/315 |
| 2013/0336202 A1* | 12/2013 | Oh ........................ | H04B 7/155 370/315 |
| 2016/0149635 A1* | 5/2016 | Hinman ............. | H04B 7/15507 370/315 |

* cited by examiner

SIGNAL AMPLIFYING DEVICE, METHOD FOR CONTROLING SIGNAL AMPLIFYING DEVICE AND METHOD FOR IDENTIFYING SIGNAL AMPLIFYING DEVICE

CROSS-REFERENCE TO RELATED APPLICATIONS

This application claims the benefit of priority to Chinese Patent Application No. 201510090143.0, filed on Feb. 27, 2015, and titled "SIGNAL AMPLIFYING DEVICE, METHOD FOR CONTROLLING SIGNAL AMPLIFYING DEVICE AND METHOD FOR IDENTIFYING SIGNAL AMPLIFYING DEVICE". The entire disclosure of which is incorporated herein by reference.

TECHNICAL FIELD

The present disclosure generally relates to a telecommunication technology field, and more particularly, to a signal amplifying device, a method for controlling a signal amplifying device, and a method for identifying a signal amplifying device.

BACKGROUND

Usually, a wireless cellular network refers to a network providing a communication service to mobile terminal devices such as a mobile phone, etc., where the wireless cellular network consists of networks with multiple elements, including each element in a Radio Access Network (RAN) and a Core Network (CN). The RAN includes elements such as a base station, a base station controller, a wireless network controller, etc. A mobile terminal device receives and processes a downlink wireless signal from the wireless cellular network and sends an uplink wireless signal so that communications with a network is realized.

Communications between the wireless cellular network and mobile terminal devices can be classified into two types of service: a Circuit Switching (CS) service and a Packet Switching (PS) service. The CS service includes CS domain voice, message, etc. The PS service includes a service with data transmitted and received in a packet form such as a multimedia message, the Voice over Internet Protocol (VoIP), the HyperText Transfer Protocol (HTTP), the File Transfer Protocol (FTP), etc. For example, for a mobile terminal running an intelligent operating system such as android, iOS, etc., if an application such as QQ, WeChat, Fetion, etc. is run, the mobile terminal logs into a server of the corresponding service provider through a PS domain, send a heartbeat packet periodically, and collect a new message, which is sent by a network, from the server. The network can page through the PS domain, where the network pages the mobile terminal and initiates a data connection in the PS domain so as to acquire data.

Currently, there are multiple parallel radio access technologies existing for the RAN, where the multiple radio access technologies includes 2G, 3G and 4G, that is, from the second generation to the fourth generation. The 2G communication system includes the Global System for Mobile communication (GSM), IS95. The 3G communication system includes the Time Division-Synchronous Code Division Multiple Access (TD-SCDMA), the Wideband Code Division Multiple Access (WCDMA) and the Code Division Multiple Access 2000 (CDMA 2000). The 4G communication system includes Long Term Evolution Advanced (LTE-A), which is an enhancement of the Long Term Evolution (LTE). Although, based on the standard division, the LTE is not categorized into the 4G technology but categorized into the advanced 3G technology, but, in general speaking, the LTE is well known as a 4G technology. Currently, the 5G technology is in a stage of definition required. Based on the recent research, the 5G technology may use even higher frequencies, for example, a bandwidth around 5 GHz.

The GSM and the WCDMA have been developed for a long time, thus the two cellular communication networks have a broader network coverage, such as in-building coverage, underground space, elevator shaft, metro (subway), and a mobile phone generally can find signals of the two cellular communication networks. However, parallel radio access technologies become more and more. Due to constraint of various factors, it is difficult to realize covering multiple cellular networks simultaneously at one location. For example, there is no enough space or no permission for setting up more base stations, antennas or repeaters. Therefore, to a certain degree, a new network will compete with an old network for network coverage resources. However, the 5G network uses even higher frequencies, which will further drop the network coverage.

Using a repeater is one of the important technical approaches for solving a network coverage problem. The repeater includes an amplifying uplink and an amplifying downlink, which consist of components or modules such as an antenna, a Radio Frequency (RF) duplexer, a low noise amplifier, a frequency mixer, a voltage variable attenuator, a filter, a power amplifier, etc. A downlink signal sent from a base station is received by the repeater through a forward-facing antenna (a donor antenna), and then the downlink signal is amplified by the low noise amplifier so as to suppress a signal noise in the downlink signal and improve the Signal to Noise Ratio (SNR). Next, the downlink signal is converted down into an intermediate-frequency signal, and then, the intermediate-frequency signal is filtered and amplified. Next, the intermediate-frequency signal is converted up into a RF signal, and then the RF signal is amplified by the power amplifier and sent to a mobile platform through a back-facing antenna (a repeat antenna). Simultaneously, an uplink signal from the mobile platform is received through the back-facing antenna and the uplink signal is processed by the amplifying uplink along a reverse path, where the uplink signal goes through the low noise amplifier, a down converter, the filter, a intermediate frequency amplifier, an up converter, a power amplifier and then is sent to the base station. Therefore, two-way communications between the base station and the mobile terminal can be realized. Connection between the repeater and the base station may adopt an optical fiber approach or a wireless approach.

Figure 1:
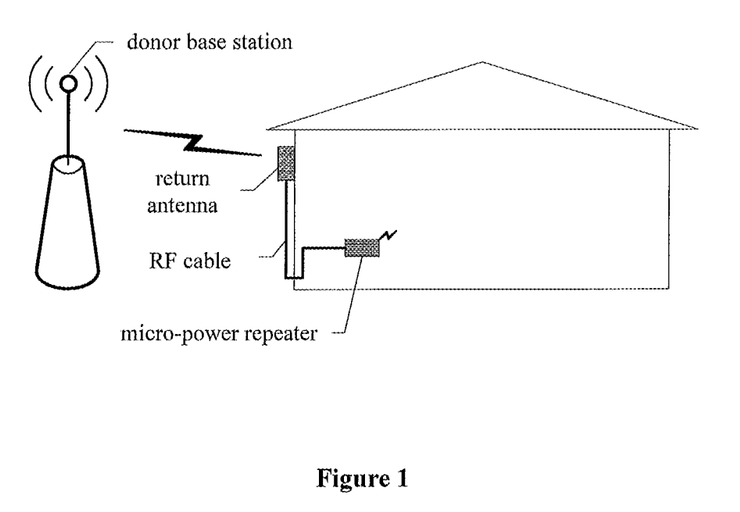
FIG. 1 schematically illustrates a diagram for use scenario of a micro-power repeater in a conventional art.

Regarding to coverage of scenarios in home-use, basement, ground floor commercial, etc., the conventional repeater has disadvantages including complicated in installation or set up, and high in cost. Therefore, a mini-repeater like product is developed. FIG. 1 schematically illustrates a diagram for use scenario of a mini-size signal strengthen device, or called "a mini-size signal amplifier" or "a micro-power repeater". Referring to FIG. 1, an outdoor return antenna, such as a plate antenna or a whip antenna, receives a signal from a donor base station and transmits the signal to an indoor micro-power repeater through a RF cable. The micro-power repeater usually includes a printed antenna that is adapted to send an amplified signal. Further, the micro-power repeater receives an uplink signal from an indoor mobile terminal and transmits the uplink signal to the outdoor return antenna through the RF cable, where the outdoor return antenna sends the uplink signal to the donor base station. The micro-power repeater adopts an approach of wireless return, which can enhance signal strength for the 2G/3G/4G system or a part of Radio Access Technologies (RATs) of the 2G/3G/4G system.

Compared to a conventional micro-power repeater, a current micro-power repeater is competitive in cost and volume. However, there is no efficient way for an operator to control the current micro-power repeater, especially, to control each individual current micro-power repeater. Accordingly, it is difficult to add more functionality to a micro-power repeater and improve performance of the micro-power repeater if the cellular wireless network cannot effectively control the micro-power repeater.

SUMMARY

The present disclosure provides a method for solving a problem that, in a conventional art, a wireless cellular network cannot effectively control each micro-power repeater, so that it is difficult to add more functionality to a micro-power repeater and improve performance of the micro-power repeater.

In order to solve the problem, embodiments of the present disclosure provide a signal amplifying device, which includes:

a baseband module, which supports a signal of a wireless cellular network, one or more return side radio frequency modules, one or more return side antennas, one or more access side radio frequency modules, one or more access side antennas and a user identification module interface;

wherein the return side antenna is adapted to receive a downlink signal of the wireless cellular network and transmit the downlink signal to the return side radio frequency module, which is coupled with the return side antenna;

wherein the return side radio frequency modules is adapted to send the received downlink signal to a corresponding access side radio frequency module and the baseband module;

wherein the baseband module is adapted to process the received downlink signal and acquire a synchronization information of the downlink signal and further adapted to control synchronization of the return side radio frequency module and the access side radio frequency module, which are coupled with the baseband module, with the downlink signal;

wherein the access side radio frequency module is adapted to send the received downlink signal to the access side antenna, and the access side antenna is adapted to send out the received downlink signal; the access side antenna is further adapted to receive an uplink signal and send the received uplink signal to the access side radio frequency module, which is coupled with the access side antenna; the access side radio frequency module is further adapted to send the uplink signal to a corresponding return side radio frequency module and the baseband module;

wherein the baseband module is further adapted to monitor the uplink signal and control synchronization of the return side radio frequency module and the access side radio frequency module, which are coupled with the baseband module, and control turning on and off of the return side radio frequency module and the access side radio frequency module;

wherein the return side radio frequency module is further adapted to send the received uplink signal to the return side antenna, which is coupled with the return side radio frequency module, and the return side antenna is further adapted to send out the received uplink signal; and wherein the user identification module interface is coupled with a user identification module, which is configured for the signal amplifying device, and the baseband module is further adapted to read a user information stored in the user identification module through the user identification module interface, so that the wireless cellular network can control the signal amplifying device.

In some embodiments, the baseband module supports the signal of the wireless cellular network for one or more radio access technologies.

In some embodiments, the one or more return side antennas correspond to different bandwidths for the signal of the wireless cellular network or signals for different radio access technologies, wherein a corresponding way includes:

one return side antenna corresponds to signals for all radio access technologies, and the one return side antenna is coupled with all return side radio frequency modules through a duplexer or an antenna switch; or each return side antenna corresponds to a signal for a radio access technology, and each return side antenna is coupled with a return side radio frequency module corresponding to a radio access technology; or multiple return side antennas correspond to a signal for a radio access technology, and the multiple return side antennas are couple with a return side radio frequency module corresponding to the radio access technology, wherein one of the multiple return side antennas also corresponds to a signal for other radio access technologies.

In some embodiments, the radio access technologies include a 2G radio access technology, a 3G radio access technology and a 4G radio access technology, and return side radio frequency modules corresponding to the 2G radio access technology, the 3G radio access technology and the 4G radio access technology are a 2G return side radio frequency module, a 3G return side radio frequency module and a 4G return side radio frequency module, respectively; wherein a corresponding way includes:

there are two or four of return side antennas, all of which correspond to the 4G radio access technology and are coupled with the 4G return side radio frequency module, wherein one of the return side antennas also corresponds to the 2G radio access technology or the 3G radio access technology and is coupled with the 2G return side radio frequency module and the 3G return side radio frequency module; or there is one return side antenna, which is coupled with the 2G return side radio frequency module, the 3G return side radio frequency module and the 4G return side radio frequency module through a duplexer or an antenna switch.

In some embodiments, the one or more access side antennas correspond to different bandwidths for the signal of the wireless cellular network or signals for different radio access technologies, wherein a corresponding way includes:

one access side antenna corresponds to signals for all radio access technologies, and the one access side antenna is coupled with all access side radio frequency modules through a duplexer or an antenna switch; or each access side antenna corresponds to a signal for a radio access technology, and each access side antenna is coupled with an access side radio frequency module corresponding to a radio access technology; or multiple access side antennas correspond to a signal for a radio access technology, and the multiple access side antennas are couple with an access side radio frequency module corresponding to the radio access technology, wherein one of the multiple access side antennas also corresponds to a signal for other radio access technologies.

In some embodiments, the radio access technologies include a 2G radio access technology, a 3G radio access technology and a 4G radio access technology, and access side radio frequency modules corresponding to the 2G radio access technology, the 3G radio access technology and the 4G radio access technology are a 2G access side radio frequency module, a 3G access side radio frequency module and a 4G access side radio frequency module, respectively; wherein a corresponding way includes:

there are two or four of access side antennas, all of which correspond to the 4G radio access technology and are coupled with the 4G access side radio frequency module, wherein one of the access side antennas also corresponds to the 2G radio access technology or the 3G radio access technology and is coupled with the 2G access side radio frequency module and the 3G access side radio frequency module; or there is one access side antenna, which is coupled with the 2G access side radio frequency module, the 3G access side radio frequency module and the 4G access side radio frequency module through a duplexer or an antenna switch; or there are two access side antennas, wherein one of the two access side antennas is coupled with the 4G access side radio frequency module and the other of the two access side antennas is coupled with the 2G access side radio frequency module and the 3G access side radio frequency module.

In some embodiments, the baseband module includes multiple sub-baseband modules, wherein each of the multiple sub-baseband modules corresponds to at least one radio access technology.

In some embodiments, the device further includes:

a Wi-Fi module, which is coupled with the baseband module, wherein the Wi-Fi module is adapted to receive and send an uplink/downlink signal between the signal amplifying device and an access equipment in the wireless cellular network.

The embodiments of the present disclosure further provides a method for controlling any one of the signal amplifying devices according to any one of the aforementioned claims, which includes:

acquiring a user information through the user identification module interface, and making the signal amplifying device to camp on a wireless cellular network using the user information through the return side radio frequency module and the return side antenna, wherein the user information is stored in the user identification module configured for the signal amplifying device;

receiving a control information for the signal amplifying device from the wireless cellular network;

controlling, based on the control information received, the signal amplifying device, the return side radio frequency module of the signal amplifying device and the access side radio frequency module of the signal amplifying device; and sending, through the return side radio frequency module and the return side antenna, a status information for the signal amplifying device to the wireless cellular network.

In some embodiments, both the control information and the status information include at least one of a circuit domain information and a packet domain information, wherein the circuit domain information includes a text message, and the packet information includes an information received for initiating a data connection in a packet domain by the baseband module based on a received paging or a information acquired for connecting to the wireless cellular network periodically by the baseband module.

In some embodiments, the control information includes: a configuration information for timed turning on and off of the signal amplifying device, a configuration information for timed turning on and off of receiving and sending function at the return side of the signal amplifying device, a configuration information for timed turning on and off of receiving and sending function at the access side of the signal amplifying device, a configuration information for uplink signal off, a configuration information for reporting a status, a configuration information for an operating bandwidth and an operating mode, a configuration information for controlling power and a configuration information for version updating.

In some embodiments, the status information includes: quantity of access equipment accessing to the wireless cellular network through the signal amplifying device, an operating mode of the access equipment, an access time duration and an access time point, a software version of the signal amplifying device and a result information acquired after the signal amplifying device processes the control information.

In some embodiments, the operating mode includes at least one of a 2G radio access technology, a 3G radio access technology, a 4G radio access technology and a Wi-Fi radio access technology.

In some embodiments, control operation performed based on the control information includes: timed turning on and off of the signal amplifying device; timed turning on and off of receiving and sending function at the return side of the signal amplifying device; timed turning on and off of receiving and sending function at the access side of the signal amplifying device; turning off an uplink signal sending function of the return side radio frequency module, status reporting for the signal amplifying device; change of an operating bandwidth and change of an operating mode based on the control information; control of sending power of the access side radio frequency module based on the control information; initiation of a data connection, then, based on a preset server information, a corresponding server is connected and a software package is downloaded and then installed.

The embodiments of the present disclosure further provides a method for identifying any one of the signal amplifying devices according to any one the aforementioned claims, which includes:

for an access equipment in a wireless cellular network, if it is determined that a user identification module is configured in the access equipment and a user information stored in the user identification module belongs to a preset specific range, the access equipment is identified as the signal amplifying device.

In some embodiments, the method further includes:

if the wireless cellular network determines that a status information for the signal amplifying device, which is sent by the access equipment, is received, the access equipment is identified as the signal amplifying device.

Compared with a conventional art, the embodiments of the present disclosure at least possess the following advantages.

By configuring a user identification module to a micro-power repeater and adding a user identification module interface, which is adaptive to the user identification module, in the micro-power repeater, a baseband module in the micro-power repeater can read a user information stored in the user identification module through the user identification module interface, so that a wireless cellular network can effectively control the micro-power repeater and, further, more functionality can be added to the micro-power repeater and performance of the micro-power repeater can be improved.

DETAILED DESCRIPTION

In order to clarify the objects, characteristics and advantages of the present disclosure, embodiments of the present disclosure will be described in conjunction with the accompanying drawings.

It should be noted that, in the embodiments, a baseband module may support a signal of a wireless cellular network in one or more radio access technologies. For example, the one or more radio access technologies may include one or more of a 2G radio access technology, a 3G radio access technology and a 4G radio access technology. This embodiment takes a 2G and 4G radio access technology for an example, where the 2G radio access technology may be the Global System for Mobile communication (GSM), the General Packet Radio Service (GPRS) or the Enhanced Data rate for GSM Evolution (EDGE); and the 4G radio access technology may be the Long Term Evolution (LTE). In some embodiments, the baseband module may support radio access technologies including the 2G; 3G and 4G radio access technology, and even including a 5G radio access technology, which is currently at a stage of definition required, a future radio access technology or a development tendency.

In some embodiments, the baseband module may further include multiple sub-baseband modules, where each of the multiple sub-baseband modules corresponds to at least one radio access technology. For example, a sub-baseband module supports the 4G radio access technology, and another sub-baseband module supports the 2G and/or 3G radio access technology.

In practice, a signal amplifying device provided in the embodiment usually serves as a micro-power repeater. The skilled person in the art appreciates that a side of the micro-power repeater, which communicates with a donor base station, is called a return side, and another side of the micro-power repeater, which communicates with an access equipment in a wireless cellular network (for example, a mobile terminal such as a mobile phone), is usually called an access side. Therefore, in the embodiments, a RF module in the signal amplifying device, where the RF module communicates with the donor base station, is called a return side RF module, and an antenna, which communicates with the donor base station, is called a return side antenna. Moreover, another RF module, which communicates with the access equipment, is called an access side RF module, and another antenna, which communicates with the access equipment, is called an access side antenna.

In practice, the signal amplifying device may include one or more return side RF modules, one or more return side antennas, one or more access side RF modules and one or more access side antennas, where the one or more return side RF modules are coupled with the one or more return side antennas, and the one or more access side RF modules are coupled with the one or more access side antennas, where all of the one or more return side RF modules and all of the one or more access side RF modules are coupled with the baseband module.

The return side antenna is adapted to receive a downlink signal from the wireless cellular network, where the downlink signal is transmitted to a corresponding access side RF module and the baseband module through the return side RF module that is coupled the return side antenna and then is sent out through the access side antenna. An uplink signal from the access equipment is received by the access side antenna, where the uplink signal is transmitted to a corresponding return side RF module and the baseband module through the access side RF module, which is coupled with the access side antenna, and then is sent out through the return side antenna. The baseband module is adapted to process the uplink/downlink signal, to control synchronization between the return side RF module and the access side RF module and control turning on and off of the return side RF module and the access side RF module.

In this embodiment, a baseband module supporting the 2G and 4G radio access technology is taken for an example. Therefore, the signal amplifying device includes a 2G return side RF module corresponding to the 2G radio access technology and a 2G access side RF module corresponding to the 2G radio access technology, and further includes a 4G return side RF module corresponding to the 4G radio access technology and a 4G access side RF module corresponding to the 2G radio access technology.

In practice, there is a corresponding relationship between the one or more return side antennas and different bandwidths for the signal of the wireless cellular network or signals for different radio access technologies. Moreover, there is a corresponding relationship between the one or more access side antennas and different bandwidths for the signal of the wireless cellular networks or signals for different radio access technologies.

The corresponding relationship between the one or more return side antennas and the different bandwidths for the signal of the wireless cellular network or the signals for the different radio access technologies may usually employ one of the following several ways.

A first way: one return side antenna corresponds to signals for all radio access technologies and the one return side antenna is coupled with all return side RF modules through a duplexer or an antenna switch.

A second way: each return side antenna corresponds to a signal for a radio access technology, and each return side antenna is coupled with a return side RF module corresponding to a radio access technology.

A third way: multiple return side antennas correspond to a signal for a radio access technology, and the multiple return side antennas are couple with a return side RF module corresponding to the radio access technology, wherein one of the multiple return side antennas also corresponds to a signal for other radio access technologies.

In this embodiment, a number of one return side antenna is taken for an example. If the baseband module supports the 2G and 4G radio access technology, both a signal for the 2G radio access technology and a signal for the 4G radio access technology is received and sent through the return side antenna. In this situation, the return side antenna is coupled with the 2G return side RF module and the 4G return side RF module through a duplexer (or, in some embodiments, through an antenna switch).

In some embodiments, if the baseband module supports the 2G; 3G and 4G radio access technology, the 2G, 3G and 4G radio access technology correspond to the 2G, 3G and 4G return side RF module, respectively. If there are two return side antennas or four return side antennas, all of the two or four return side antennas may correspond to the 4G radio access technology and be coupled with the 4G return side RF module, where one of the two or four return side antennas may also correspond to the 2G or 3G radio access technology and be coupled with the 2G and 3G return side RF module. If there is one return side antenna, the one return side antenna may be coupled with the 2G, 3G and 4G return side RF module through a duplexer or an antenna switch.

The corresponding relationship between the one or more access side antennas and the different bandwidths for the signal of the wireless cellular network or the signals for the different radio access technologies may usually employ one of the following several ways.

A first way: one access side antenna corresponds to the signals for all radio access technologies and the one access side antenna is coupled with all access side radio frequency modules through a duplexer or an antenna switch.

A second way: each access side antenna corresponds to the signal for a radio access technology, and each access side antenna is coupled with an access side radio frequency module corresponding to a radio access technology.

A third way: multiple access side antennas correspond to the signal for a radio access technology, and the multiple access side antennas are couple with an access side radio frequency module corresponding to the radio access technology, wherein one of the multiple access side antennas also corresponds to the signal for other radio access technologies.

In this embodiment, a number of two access side antennas are taken for an example. If the baseband module supports the 2G and 4G radio access technology, one of the two access side antennas corresponds to the 2G radio access technology and is coupled with the 2G access side RF module, thus the access side antenna is adapted to receive and transmit a signal for the 2G radio access technology; the other of the two access side antennas corresponds to the 4G radio access technology and is coupled with the 4G access side RF module, thus the other of the two access side antennas is adapted to receive and transmit a signal for the 4G radio access technology.

In some embodiments, if the baseband module supports the 2G, 3G and 4G radio access technology, the 2G, 3G and 4G radio access technology correspond to the 2G, 3G and 4G access side RF module, respectively. If there are two access side antennas or four access side antennas, all of the two or four access side antennas may correspond to the 4G radio access technology and be coupled with the 4G access side RF module, where one of the two or four access side antennas also corresponds to the 2G or 3G radio access technology and is coupled with the 2G and 3G return side RF module. If there is one access side antenna, the one access side antenna is coupled with the 2G, 3G and 4G access side RF module through a duplexer or an antenna switch. If there are two access side antennas, one of the two access side antennas is coupled with the 4G access side RF module, and the other of the two access side antennas is coupled with the 2G and 3G access side RF module.

Inventors find that a micro-power repeater actually can be realized based on a baseband chip and a RF chip of a mobile terminal that supports one or more radio access technologies. That is, compared with a mobile terminal with single mode (namely, only one radio access technology is supported), the micro-power repeater includes a RF chip, which supports a corresponding radio access technology. Compared with a mobile terminal with double or multiple modes (namely, two or more radio access technologies are supported), the micro-power repeater includes a RF chip, which supports two or more radio access technologies. However, the micro-power repeater is not required to support a user identification module card such as the Subscriber Identity Module (SIM) card, the UMTS SIM (USIM) card or the User Identity Module (UIM) card, or a module such as a screen module or a keyboard module.

For one skilled in the art, a repeater is used for solving a problem of network coverage, thus amplifying effect on a signal for a repeater is more concerned; however, controlling each micro-power repeater and how to control a micro-power repeater are neglected frequently. Furthermore, a relationship between a micro-power repeater and a mobile terminal is also not concerned frequently.

Inventors breaks down a common "technical bias" for one skilled in the art and innovatively proposes a solution that a micro-power repeater can be modified so as to serve as "a special mobile terminal" by configuring a user identification module for the micro-power repeater and adding a user identification module interface, which is adaptive to the user identification module, in the micro-power repeater. Thus, a baseband module in the micro-power repeater can read a user information stored in the user identification module through the user identification module interface so that a wireless cellular network can effectively control the micro-power repeater like managing and controlling an access mobile terminal, and further, more functionalities can be added and performance can be improved.

Figure 2:
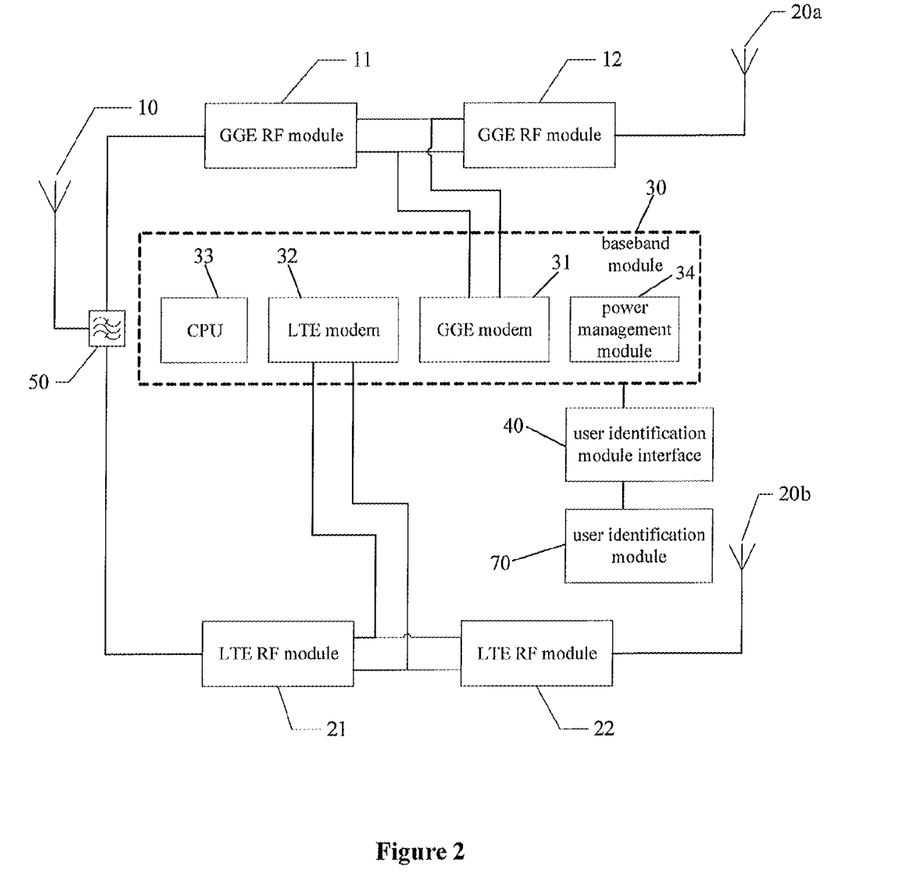
FIG. 2 schematically illustrates a structural diagram for a signal amplifying device according to an embodiment in the present disclosure.

FIG. 2 schematically illustrates a structural diagram for a signal amplifying device according to an embodiment in the present disclosure. Referring to FIG. 2, the signal amplifying device includes the following components.

A return side antenna 10, which is adapted to support for receiving and sending a signal for the 2G or 4G radio access technology in a wireless cellular network.

A GSM/GPRS/EDGE (GGE) RF module 11 and a GGE RF module 12, which corresponds to the 2G radio access technology, where the GGE RF module 11 is a 2G return side RF module and the GGE RF module 12 is a 2G access side RF module, where the GGE RF module 11 and the GGE RF module 12 are coupled together.

A duplexer 50, which is adapted to connect the return side antenna 10 with the GGE RF module 11 and the GGE RF module 12.

A LTE RF module 21 and a LTE RF module 22, which correspond to the 4G radio access technology, where the LTE RF module 21 is a 4G return side RF module and the LTE RF module 22 is a 4G access side RF module, where the LTE RF module 21 and the LTE RF module 22 are coupled together.

An access side antenna 20*a*, which corresponds to the 2G radio access technology and is coupled the GGE RF module 12.

An access side antenna 20*b*, which corresponds to the 4G radio access technology and is coupled the LTE RF module 22.

A baseband module 30, which supports the 2G or 4G radio access technology; wherein the baseband module 30 includes a GGE modem 31, a LTE modem 32, a Central Processing Unit (CPU) 33 and a power management module 34, where the GGE RF module 11, the GGE RF module 12, the LTE RF module 21 and the LTE RF module 22 are all coupled with the baseband module 30.

A user identification module interface 40, which is coupled with the baseband module 30.

In practice, since the signal amplifying device is usually applied to scenarios such as a home, a basement, a ground floor commercial district, etc., the return side antenna 10 serves in a form of an outdoor antenna, where the return side antenna 10 is adapted to receive an outdoor signal (a downlink signal) from a donor base station and transmit an indoor signal (an uplink signal) from an access equipment (e.g., a mobile terminal such as an indoor mobile phone, etc.) to the donor base station, and the access side antenna 20a and the access side antenna 20b serve as indoor antennas, which send a received downlink signal to indoor.

Referring to FIG. 2, the embodiment provides the signal amplifying device including two GGE RF modules: the GGE RF module 11 corresponding to an outdoor GSM/GPRS/EDGE (GGE) donor base station and the GGE RF module 12 corresponding to an indoor access equipment working in a GSM/GPRS/EDGE (GGE) radio access technology. Moreover, the signal amplifying device further includes two LTE RF modules: the LTE RF module 21 corresponding to an outdoor LTE donor base station and the LTE RF module 22 corresponding to an indoor access equipment working in a LTE radio access technology. The GSM/GPRS/EDGE (GGE) donor base station and the LTE donor base station may be different base stations.

It should be note that, since GSM/GPRS/EDGE is usually abbreviated to "GGE", in this embodiment, the GGE RF module is an abbreviation of a GSM/GPRS/EDGE RF module, where the GGE RF module can support the GSM, GPRS and EDGE radio access technology. Similarly, the GGE modem is an abbreviation of a GSM/GPRS/EDGE modem.

In practice, the return side antenna 10 receives a downlink IQ (namely, an I path, a Q path) signal from a donor base station and transmits the downlink IQ signal to the GGE RF module 11 and the LTE RF module 21.

The GGE RF module 11 sends a downlink IQ signal for the GSM/GPRS/EDGE radio access technology to the GGE RF module 12. The LTE RF module 21 sends a downlink IQ signal for the LTE radio access technology to the LTE RF module 22.

The GGE RF module 12 sends a received GSM/GPRS/EDGE downlink signal to indoor and receives a GSM/GPRS/EDGE uplink signal from an access equipment, where the GSM/GPRS/EDGE uplink signal is transmitted to the GGE RF module 11 and then sent to the GSM/GPRS/EDGE donor base station.

The LTE RF module 22 sends a received LTE downlink signal to indoor and receives a LTE uplink signal from an access equipment, where the LTE uplink signal is transmitted to the LTE RF module 21 and then sent to the LTE donor base station.

For signal transmission between the GGE RF module 11 and the GGE RF module 12 and signal transmission between the LTE RF module 21 and the LTE RF module 22, all related signals are sent to the baseband module 30, where the baseband module 30 is adapted to process a received downlink signal and acquire synchronous an information of the downlink signal. The baseband module 30 is further adapted to control synchronization of the GGE RF module 11 and the GGE RF module 12, which are coupled with the baseband module 30, with the downlink signal and control synchronization of the LTE RF module 21 and the LTE RF module 22 with the downlink signal. The baseband module 30 is further adapted to monitor an uplink signal. Moreover, the baseband module 30 is further adapted to control synchronization of the GGE RF module 11 and the GGE RF module 12, which are coupled with the baseband module 30, and control the GGE RF module 11 and the GGE RF module 12 turning on and off. The baseband module 30 is further adapted to control synchronization of the LTE RF module 21 and the LTE RF module 22, and control of the LTE RF module 21 and the LTE RF module 22 turning on and off.

Specifically, both the GGE RF module 11 and the GGE RF module 12 are coupled with the GGE modem 31 in the baseband module 30, and both the LTE RF module 21 and the LTE RF module 22 are coupled with the LTE modem 32 in the baseband module 30. The GGE modem 31 performs a corresponding downlink synchronization check and an uplink signal monitor so as to perform synchronization, power control, power management, etc. for the corresponding GGE RF module 11 and GGE RF module 12. Similarly, the LTE modem 32 performs a corresponding downlink synchronization check and an uplink signal monitor so as to perform synchronization, power control, power management, etc. for the corresponding RF module 21 and LTE RF module 22.

In practice, the CPU 33, the LTE modem 32 and the GGE modem 31 constitute an important component of a LTE/GSM multi-mode baseband chip (namely, the baseband module 30). Specifically, in this embodiment, the power management module 34 is integrated into the baseband module 30 and serves as a component of the baseband module 30. In some embodiments, the power management module 34 may be an individual chip disposed in the signal amplifying device. One skilled person in the art appreciates functionality of the CPU 33 and the power management module 34 in the baseband module 30, which is not described hereinafter.

In this embodiment, the baseband module 30 is coupled with a user identification module 70, which is configured for the signal amplifying device, through the user identification module interface 40. The baseband module 30 is further adapted to read a user information stored in the user identification module 70 through the user identification module interface 40 so as to realize that a wireless cellular network take control of the signal amplifying device.

One skilled in the art appreciates that a mobile terminal uses a user information stored in a user identification module card such as SIM/USIM, UIM, etc. for camping on a wireless cellular network, so that the wireless cellular network can identify and authenticate a user. The user identification module card such as SIM/USIM, etc. includes multiple types of identification information including a telephone number, a SIM/USIM card number (namely, an Integrate Circuit Card Identify (ICCID)), etc., which are particular identifiers to the user.

Therefore, one skilled in the art easily appreciates that the signal amplifying device in this embodiment, which serves as a "special mobile terminal", can camp on a wireless cellular network by reading a user information stored in the user identification module 70, which is configured for the signal amplifying device so that the wireless cellular network can identify and authenticate the "user". In a conventional art, a range for a use identifier of each mobile terminal is usually configured. However, in this embodiment, it is different from the conventional art that the signal amplifying device is not a general mobile terminal, thus it is required that a specific range for a use identifier of the signal amplifying device is configured so that the wireless cellular network can successfully identify this kind of "special user". A detailed identification procedure can refer to a method for identifying the signal amplifying device, which is described below.

Figure 3:
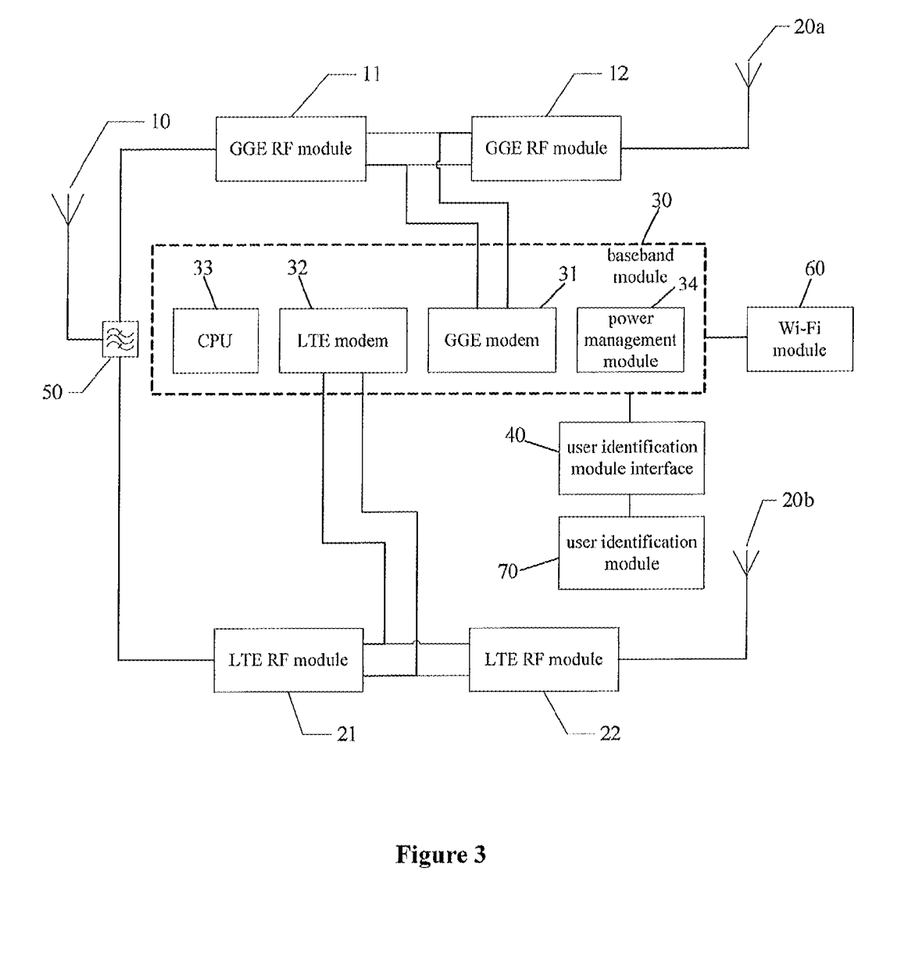
FIG. 3 schematically illustrates a structural diagram for a signal amplifying device according to another embodiment in the present disclosure.

FIG. 3 schematically illustrates a structural diagram for a signal amplifying device according to another embodiment in the present disclosure. Compared with the signal amplifying device as shown in FIG. 2, the signal amplifying device as shown in FIG. 3 further includes a Wi-Fi module 60, which is coupled with the baseband module, where the Wi-Fi module 60 is adapted to receive and send an uplink/downlink signal between the signal amplifying device and an access equipment.

In practice, if an access equipment accessing to a wireless cellular network through the signal amplifying device further supports a Wi-Fi radio access technology and a wireless environment, which is suitable for a Wi-Fi transmission, exists currently, the uplink and downlink signal transmissions between the signal amplifying device and the access equipment are performed through the Wi-Fi module 60. Specifically, the baseband module 30 may transmit a received downlink signal to the Wi-Fi module 60, and the Wi-Fi module 60 sends the downlink signal to an indoor access equipment in the Wi-Fi radio access technology. And, the Wi-Fi module 60 receives an uplink signal from the access equipment.

Figure 4:
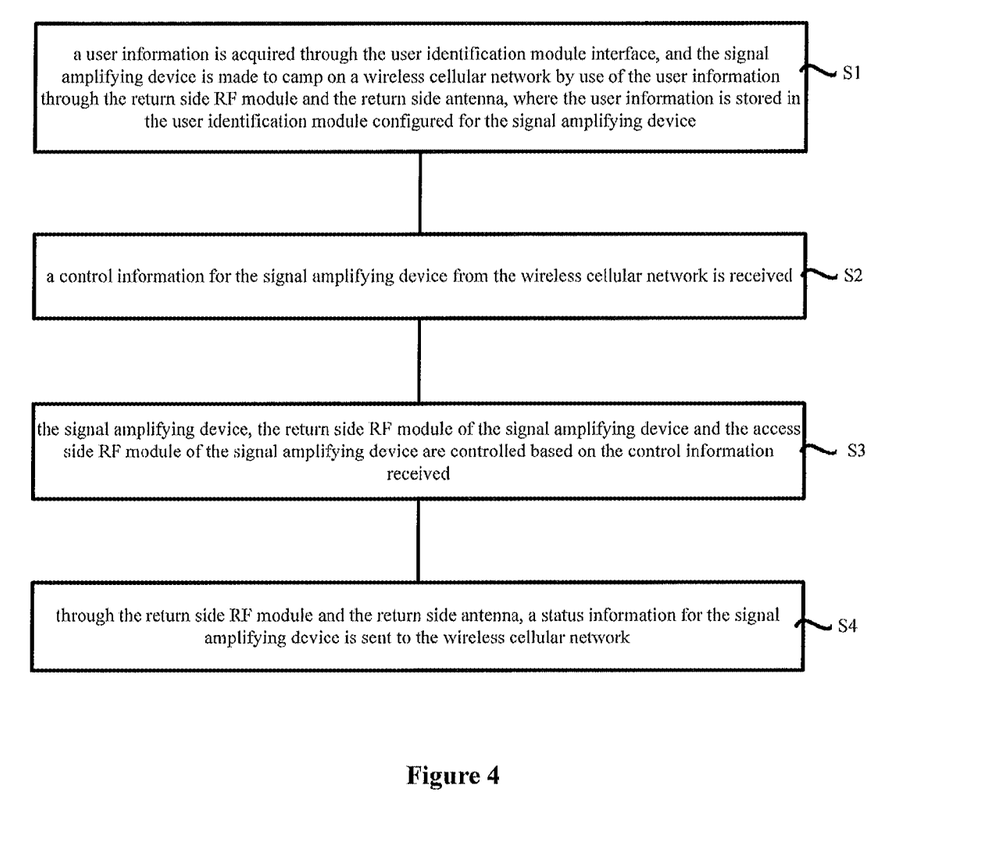
FIG. 4 schematically illustrates a flow diagram for a method for controlling a signal amplifying device according to an embodiment in the present disclosure.

The embodiment of the signal amplifying device as shown in FIG. 4 can refer to the embodiment of the signal amplifying device as shown in FIG. 3, thus it is not described hereinafter.

Based on the signal amplifying device described hereinbefore, the embodiments of the present disclosure further provide a method for controlling the signal amplifying device, which including the steps below.

S1, a user information is acquired through the user identification module interface, and the signal amplifying device is made to camp on a wireless cellular network by use of the user information through the return side RF module and the return side antenna, where the user information is stored in the user identification module configured for the signal amplifying device.

S2, a control information for the signal amplifying device from the wireless cellular network is received.

S3, the signal amplifying device, the return side RF module of the signal amplifying device and the access side RF module of the signal amplifying device are controlled based on the control information received.

S4, through the return side RF module and the return side antenna, a status information for the signal amplifying device is sent to the wireless cellular network.

In practice, the steps S1 to S4 may be entirely realized by the baseband module.

In practice, the control information and the status information may each include at least one of a circuit domain information and a packet domain information, where the circuit domain information includes a text message, and the packet information includes an information received for initiating a data connection in the packet domain by the baseband module based on a received paging or an information acquired for connecting to a wireless cellular network periodically by the baseband module.

Specifically, the control information may include: a configuration information for timed turning on and off of the signal amplifying device, a configuration information for timed turning on and off of receiving and sending function at the return side of the signal amplifying device, a configuration information for timed turning on and off of receiving and sending function at the access side of the signal amplifying device, a configuration information for uplink signal off, a configuration information for reporting a status, a configuration information for an operating bandwidth and an operating mode, a configuration information for controlling power and a configuration information for version updating. The status information includes: quantity of access equipment, an operating mode of the access equipment, an access time duration and an access time point, where the access equipment accesses to a wireless cellular network through the signal amplifying device. The status information further includes: a software version of the signal amplifying device and a result information acquired after processing the control information by the signal amplifying device.

In practice, if a wireless cellular network detects that no access data at the access side has been transmitted for a long time, for example, for lasting one hour, the signal amplifying device is turned off and a reboot time for the signal amplifying device is preset through the control information, for example, the signal amplifying device reboots after being turned off for one hour, or the receiving and sending function at the return side of the signal amplifying device is turned off individually and a reboot time for the receiving and sending function at the return side is preset so that an activation status of the signal amplifying device is preserved, or timed turning on and off of the signal amplifying device at the access side is controlled individually.

Specifically, in this embodiment, the operating mode refers to a radio access technology selected by the signal amplifying device when the signal amplifying device is operating, where the signal amplifying device may support multiple radio access technologies. However, during operation, one or more of the multiple radio access technologies may be usually selected, for example, the Wi-Fi radio access technology may be selected for operation, or both the Wi-Fi radio access technology and the 2G radio access technology are selected for operation.

In this embodiment, a control operation performed based on the control information includes: timed turning on and off of the signal amplifying device; timed turning on and off of the receiving and sending function at the return side of the signal amplifying device; timed turning on and off of the receiving and sending function at the access side of the signal amplifying device; turning off an uplink signal sending function of the return side RF module; status reporting for the signal amplifying device; change of the operating bandwidth and the operating mode based on the control information; control of sending power of the access side RF module based on the control information; initiation of a data connection, then, based on preset server information, a corresponding server is connected and a software package is downloaded and then installed.

Based on the signal amplifying device, the embodiments of the present disclosure further provide a method for identifying the signal amplifying device. For a current wireless cellular network, a signal amplifying device with the SIM/USIM may serve as a mobile terminal, thus it is required that the signal amplifying device is identified by the network.

In this embodiment, the method for identifying the signal amplifying device includes: for an access equipment in a wireless cellular network, if it is determined that a user identification module is configured in the access equipment and a user information stored in the user identification module belongs to a preset specific range, the access equipment is identified as the signal amplifying device.

In this embodiment, the method for identifying the signal amplifying device further includes: if the wireless cellular network determines that a status information for the signal amplifying device, which is sent by the access equipment, is received, the access equipment is identified as the signal amplifying device.

The disclosure is disclosed, but not limited, by preferred embodiments as above. Based on the disclosure of the disclosure, those skilled in the art can make any variation and modification without departing from the scope of the disclosure. Therefore, the scope of the present disclosure shall be subject to the scope of the claim.

The invention claimed is:

1. A signal amplifying device, comprising:
   a baseband module, which supports a signal of a wireless cellular network, at least one return side radio frequency module, at least one return side antenna, at least one access side radio frequency module, at least one access side antenna and a user identification module interface;
   wherein the at least one return side antenna is adapted to receive a downlink signal of the wireless cellular network and transmit the downlink signal to the at least one return side radio frequency module, which is coupled with the at least one return side antenna; wherein the at least one return side radio frequency module is adapted to send the received downlink signal to a corresponding access side radio frequency module and the baseband module;
   wherein the baseband module is adapted to process the received downlink signal and acquire a synchronization information of the downlink signal and further adapted to control synchronization of the at least one return side radio frequency module and the at least one access side radio frequency module, which are coupled with the baseband module, with the downlink signal;
   wherein the at least one access side radio frequency module is adapted to send the received downlink signal to the at least one access side antenna, and the at least one access side antenna is adapted to send out the received downlink signal; the at least one access side antenna is further adapted to receive an uplink signal and send the received uplink signal to the at least one access side radio frequency module, which is coupled with the at least one access side antenna; the at least one access side radio frequency module is further adapted to send the uplink signal to a corresponding return side radio frequency module and the baseband module;
   wherein the baseband module is further adapted to monitor the uplink signal and control synchronization of the at least one return side radio frequency module and the at least one access side radio frequency module, which are coupled with the baseband module, and control turning on and off of the at least one return side radio frequency module and the at least one access side radio frequency module;
   wherein the at least one return side radio frequency module is further adapted to send the received uplink signal to the at least one return side antenna, which is coupled with the at least one return side radio frequency module, and the at least one return side antenna is further adapted to send out the received uplink signal;
   wherein the user identification module interface is coupled with a user identification module, which is configured for the signal amplifying device, and the baseband module is further adapted to read a user information stored in the user identification module through the user identification module interface and to make the signal amplifying device to camp on the wireless cellular network using the user information, so that the wireless cellular network can control the signal amplifying device; and
   wherein the baseband module is further adapted to process the received downlink signal and acquire a control information of the downlink signal, and control turning on and off of the at least one return side radio frequency module and the at least one access side radio frequency module based on the control information.

2. The signal amplifying device according to claim 1, wherein the baseband module supports the signal of the wireless cellular network for at least one radio access technology.

3. The signal amplifying device according to claim 2, wherein the at least one return side antennas correspond to different bandwidths for the signal of the wireless cellular network or signals for different radio access technologies, wherein a corresponding way comprises:
   one return side antenna corresponds to signals for all radio access technologies, and the one return side antenna is coupled with all return side radio frequency modules through a duplexer or an antenna switch; or
   each return side antenna corresponds to a signal for a radio access technology, and each return side antenna is coupled with a return side radio frequency module corresponding to a radio access technology; or
   multiple return side antennas correspond to a signal for a radio access technology, and the multiple return side antennas are couple with a return side radio frequency module corresponding to the radio access technology, wherein one of the multiple return side antennas also corresponds to a signal for other radio access technologies.

4. The signal amplifying device according to claim 3, wherein the at least one radio access technology comprise a 2G radio access technology, a 3G radio access technology and a 4G radio access technology, and return side radio frequency modules corresponding to the 2G radio access technology, the 3G radio access technology and the 4G radio access technology are a 2G return side radio frequency module, a 3G return side radio frequency module and a 4G return side radio frequency module, respectively; wherein a corresponding way comprises:
   there are two or four of return side antennas, all of which correspond to the 4G radio access technology and are coupled with the 4G return side radio frequency module, wherein one of the return side antennas also corresponds to the 2G radio access technology or the 3G radio access technology and is coupled with the 2G return side radio frequency module and the 3G return side radio frequency module; or
   there is one return side antenna, which is coupled with the 2G return side radio frequency module, the 3G return side radio frequency module and the 4G return side radio frequency module through a duplexer or an antenna switch.

5. The signal amplifying device according to claim 2, wherein the at least one access side antennas correspond to different bandwidths for the signal of the wireless cellular network or signals for different radio access technologies, wherein a corresponding way comprises:

one access side antenna corresponds to signals for all radio access technologies, and the one access side antenna is coupled with all access side radio frequency modules through a duplexer or an antenna switch; or each access side antenna corresponds to a signal for a radio access technology, and each access side antenna is coupled with an access side radio frequency module corresponding to a radio access technology; or multiple access side antennas correspond to a signal for a radio access technology, and the multiple access side antennas are couple with an access side radio frequency module corresponding to the radio access technology, wherein one of the multiple access side antennas also corresponds to a signal for other radio access technologies.

6. The signal amplifying device according to claim 5, wherein the at least one radio access technology comprise a 2G radio access technology, a 3G radio access technology and a 4G radio access technology, and access side radio frequency modules corresponding to the 2G radio access technology, the 3G radio access technology and the 4G radio access technology are a 2G access side radio frequency module, a 3G access side radio frequency module and a 4G access side radio frequency module, respectively; wherein a corresponding way comprises:

there are two or four of access side antennas, all of which correspond to the 4G radio access technology and are coupled with the 4G access side radio frequency module, wherein one of the access side antennas also corresponds to the 2G radio access technology or the 3G radio access technology and is coupled with the 2G access side radio frequency module and the 3G access side radio frequency module; or there is one access side antenna, which is coupled with the 2G access side radio frequency module, the 3G access side radio frequency module and the 4G access side radio frequency module through a duplexer or an antenna switch; or there are two access side antennas, wherein one of the two access side antennas is coupled with the 4G access side radio frequency module and the other of the two access side antennas is coupled with the 2G access side radio frequency module and the 3G access side radio frequency module.

7. The signal amplifying device according to claim 2, wherein the baseband module comprises a plurality of sub-baseband modules, wherein each of the plurality of sub-baseband modules corresponds to at least one radio access technology.

8. The signal amplifying device according to claim 1, further comprising: a Wi-Fi module, which is coupled with the baseband module, wherein the Wi-Fi module is adapted to receive and send an uplink/downlink signal between the signal amplifying device and an access equipment in the wireless cellular network.

9. The signal amplifying device according to claim 1, wherein after the signal amplifying device camps on the wireless cellular network, the baseband module is further adapted to:

send, through the at least one return side radio frequency module and the at least one return side antenna, a status information for the signal amplifying device to the wireless cellular network.

10. The signal amplifying device according to claim 9, wherein both the control information and the status information comprise at least one of a circuit domain information and a packet domain information, wherein the circuit domain information comprises a text message, and the packet information comprises an information received for initiating a data connection in a packet domain by the baseband module based on a received paging or a information acquired for connecting to the wireless cellular network periodically by the baseband module.

11. The signal amplifying device according to claim 9, wherein the control information comprises: a configuration information for timed turning on and off of the signal amplifying device, a configuration information for timed turning on and off of receiving and sending function at the return side of the signal amplifying device, a configuration information for timed turning on and off of receiving and sending function at the access side of the signal amplifying device, a configuration information for uplink signal off, a configuration information for reporting a status, a configuration information for an operating bandwidth and an operating mode, a configuration information for controlling power and a configuration information for version updating.

12. The signal amplifying device according to claim 9, wherein the status information comprises: quantity of access equipment accessing to the wireless cellular network through the signal amplifying device, an operating mode of the access equipment, an access time duration and an access time point, a software version of the signal amplifying device and a result information acquired after the signal amplifying device processes the control information.

13. The signal amplifying device according to claim 9, wherein control operation performed based on the control information comprises: timed turning on and off of the signal amplifying device; timed turning on and off of receiving and sending function at the return side of the signal amplifying device; timed turning on and off of receiving and sending function at the access side of the signal amplifying device; turning off an uplink signal sending function of the at least one return side radio frequency module, status reporting for the signal amplifying device; change of an operating bandwidth and change of an operating mode based on the control information; control of sending power of the at least one access side radio frequency module based on the control information; initiation of a data connection, then, based on a preset server information, a corresponding server is connected and a software package is downloaded and then installed.

14. The signal amplifying device according to claim 13, if the wireless cellular network detects that no access data at the access side is transmitted for a preset time, the wireless cellular network controls the signal amplifying device to turn off and presets a reboot time for the signal amplifying device through the control information; or turns off a receiving and sending function at the return side of the signal amplifying device individually and presets a reboot time for the receiving and sending function at the return side; turns off a receiving and sending function at the receiving side of the signal amplifying device individually and presets a reboot time for the receiving and sending function at the receiving side.

15. The signal amplifying device according to claim 1, wherein the user information belongs to a preset specific range.

16. The signal amplifying device according to claim 1, wherein the uplink signal comprises a status information.

\* \* \* \* \*